United States Patent [19]

Butzow et al.

[11] 4,107,381

[45] Aug. 15, 1978

[54] COMPOSITE ARTICLE PROVIDING SEAMLESS FABRIC-LINED BEARINGS IN MULTIPLE

[75] Inventors: Neil W. Butzow, Greendale; Bernhard Harris, Milwaukee, both of Wis.

[73] Assignee: Rexnord Inc., Milwaukee, Wis.

[21] Appl. No.: 665,203

[22] Filed: Mar. 9, 1976

Related U.S. Application Data

[60] Continuation of Ser. No. 398,367, Sep. 18, 1973, abandoned, which is a division of Ser. No. 730,399, May 20, 1968, Pat. No. 3,616,000, which is a continuation of Ser. No. 95,363, Dec. 4, 1970, abandoned.

[51] Int. Cl.² .................. B32B 1/08; B32B 17/06
[52] U.S. Cl. .................. 428/365; 139/420 R; 139/420 C; 156/173; 156/189; 156/190; 156/195; 308/238; 308/DIG. 8; 428/36; 428/113; 428/222; 428/232; 428/246; 428/259; 428/377
[58] Field of Search .................. 428/35, 36, 259, 365, 428/105, 114, 226, 246, 222, 377, 112, 113, 232; 156/173, 189, 190, 195, 86, 175; 139/420 R, 420 C; 308/238, DIG. 7, DIG. 8

[56] References Cited

U.S. PATENT DOCUMENTS

| 2,862,283 | 12/1958 | Rosero | 428/252 |
|---|---|---|---|
| 3,131,979 | 5/1964 | Shobert | 308/238 |
| 3,328,106 | 6/1967 | Spokes et al. | 308/238 |
| 3,560,065 | 2/1971 | Shobert et al. | 308/238 |
| 3,697,346 | 10/1972 | Van Dorn et al. | 156/173 |

Primary Examiner—Stanley S. Silverman
Attorney, Agent, or Firm—Sughrue, Rothwell, Mion, Zinn and Macpeak

[57] ABSTRACT

A fabric sleeve having lengthwise yarns of a low friction material and circumferential threads of a bondable material is secured on a mandrel utilizing in particular the heat shrinkage of the circumferential threads but also the axial shrinkage of the low friction material. After cooling, the sleeve is impregnated with a liquid resin and may be stored for future use utilizing the ends of the mandrel for support and handling. When required, the resin is cured to form a rigid tube. The tube has an internal bearing surface a predetermined size larger than the mandrel and may be readily withdrawn from the tube and then cut to selected lengths to comprise the desired bearings.

17 Claims, 10 Drawing Figures

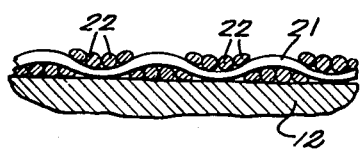
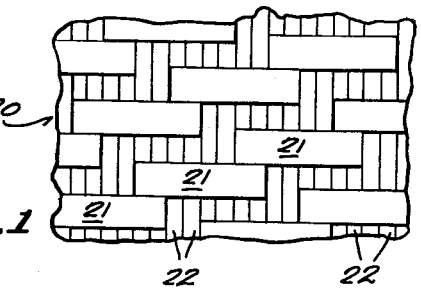
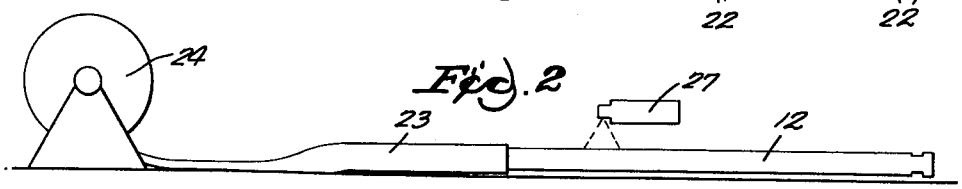
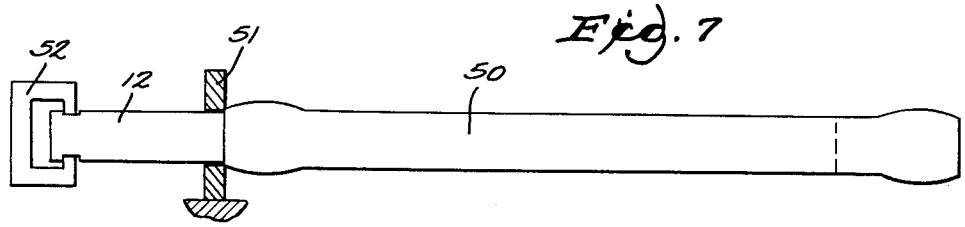
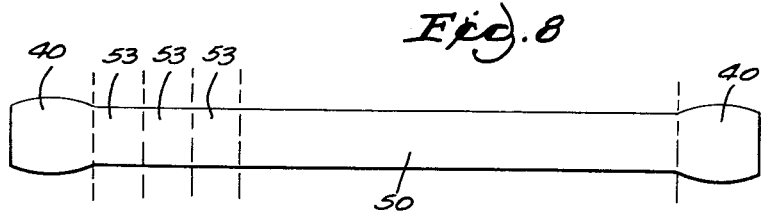
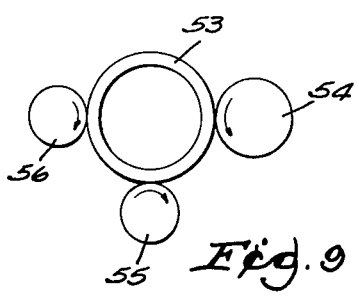
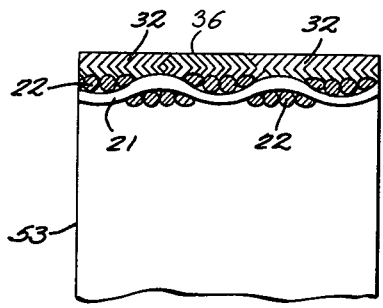

COMPOSITE ARTICLE PROVIDING SEAMLESS FABRIC-LINED BEARINGS IN MULTIPLE

CROSS REFERENCE TO RELATED APPLICATIONS:

This is a continuation of application Ser. No. 398,367, filed Sept. 18, 1973, and now abandoned. Application Ser. No. 398,367 was in turn a continuation of application Ser. No. 95,363, filed Dec. 4, 1970, and now abandoned. Application Ser. No. 95,363 was in turn a division of application Ser. No. 730,399, filed May 20, 1966, and now U.S. Pat. No. 3,616,000, issued Oct. 26, 1971.

This application is a continuation of application Ser. No. 95,363 filed Dec. 4, 1970, and now abandoned. That application was a division of application Ser. No. 730,399 filed by the present Inventors on May 20, 1968, and now U.S. Pat. No. 3,616,000 dated Oct. 26, 1971.

BACKGROUND OF THE INVENTION

1. Field of the Invention

The subject matter of the claimed invention is a composite article of manufacture from which a number of low friction devices are adapted to be made in duplicate. Each such device is adapted to be fixed in a housing to provide a bearing surface and comprises a sleeve, bushing or liner of a filament reinforced resin material having a low friction bearing surface. Class 160.

2. Description of the Prior Art

The prior art includes the molding of bearings or bearing liners directly over the journal or a mandrel substitute therefor; the manufacture of a series of bearings in the form of a tube which is then cut into short lengths; winding resin-bound glass-filament tapes over a long mandrel in the manufacture of reinforced plastic pipe; and braiding yarns of low friction material on a long mandrel and thereover braiding glass-filaments to form a resin-bound tubular structure which is then cut to bearing lengths.

The low friction characteristics of various polyethelenes has also been known since, for example, publication of British patent No. 698,611. As described therein, the polyethelene is drawn into filaments and woven with other yarn into a cloth which is embedded in a resin which is then hardened to comprise the bearing.

An equivalent of polyethylene developed and sold as "Teflon" by E. I. du Pont de Nemours and Company, Wilmington, Delaware has outstanding low friction characteristics when drawn into a filament. Teflon is a tetrafluoroethylene which is stable and heat and wear-resistant. However, this material is difficult to use because it is subject to cold flow under pressure and the few hardenable plastics or liquids which will adhere securely thereto are themselves difficult to handle.

U.S. Pat. No. 2,885,248 discloses a method of overcoming the cold flow difficulty by eliminating the "other yarn", i.e. by making the exposed cloth entirely out of Teflon so that the unexposed Teflon is entirely surrounded only by the hardened material in which it is embedded.

U.S. Pat. Nos. 2,804,886 (Re. 24,765) discloses a method of overcoming the bonding difficulty by providing a "compound" cloth woven so that the Teflon threads substantially form the exposed bearing face and leave the bondable yarn to form the other or opposite side.

The manufacture of bearings as taught by these patents requires that such cloth and the resin be placed under heat and pressure between the assembled bearing parts to be sure that the fabric is embedded in the resin and the resin fills the fabric. This requires that the fabric be cut in swatches, treated with resin, assembled and the assemblies individually handled throughout the entire manufacturing process.

In the prior art type of winding referred to which is adapted to the present invention, roves of glass filaments are drawn from creels under equal tension and passed through a container of liquid resin. The impregnated roves are gathered to form a tape which is wound in spiral layers over a rotating mandrel. Each spiral is pitched or has a pitch angle so that its adjacent turns are spaced a distance equal to or just slightly less than the width of the tape or a multiple thereof.

For example, a multiple of two may be used and the winding may start at the left end of the mandrel. At the right end the direction of the spiral is reversed. At this point, if the pitch angle is too great, the end of the first spiral must be secured to the mandrel to prevent being unwound by the start of the second spiral. This involves stopping the rotation of the mandrel, considerable lost time and extreme inconvenience caused by dripping of the liquid resin of the tape.

On this account, the pitch angle must be something less than 40° so that the tape stays in place when the direction of the winding is reversed. Thus, the mandrel may rotate continuously as the direction of the spiral is reversed at each end thereof.

In this manner the second spiral is crossed over the first; the third spiral is crossed over the second and alongside the exposed parts of the first; the fourth spiral is similarly crossed over the third alongside the exposed parts of the second; the fifth spiral completes the spiral pattern in one direction; and the sixth spiral completes the spiral pattern in the other direction.

Although the enlarged ends of the completed tube where the windings reverse must be cut off and scrapped, this type of winding especially allows high-speed, mass production techniques and is used in the manufacture of reinforced plastic pipe. The present invention successfully utilizes such techniques.

SUMMARY OF THE INVENTION

The present invention overcomes the difficulties encountered in attempts to utilize the prior art described to provide low-cost bearings equal to the relatively higher-cost bearings manufactured in accordance with the U.S. patents mentioned. In particular, the invention provides a seamless fabric-lined bearing which can be manufactured in multiple lengths; a fabric which may be woven by conventional looms in sleeves of indefinite length and cut first to the multiple lengths referred to; a fabric which shrinks circumferentially to conform closely to the dimensions of the mandrel; a fabric of threads including a low-friction material and of threads, of course, having a capability of bonding to the resin to be employed and which fabric, when placed on a mandrel is conformed closely with the outer dimension of the mandrel by applying tension to the fabric circumferentially with respect to the mandrel; a glass-filament tape which compresses the fabric on the mandrel; a sleeve which "holds itself" on the mandrel and resists displacement by the tape which must be applied under tension; a bearing having an internal bearing face and an outer cylindrical form to fit within the bore of a housing, the bearing being of the type comprising a fabric including yarns of a low-friction material partially embedded in a hardened resin to define the bearing face and reinforcing filaments helically wound in layers around the fabric and also embedded in such resin, said fabric being in the form of a seamless sleeve having yarns which are capable of being under tension and bonded to the resin and interwoven with the low-friction yarns to secure the same against displacement, said low-friction yarns extending from end to end of the bearing, said other yarns extending circumferentially of the bearing axis and also from end to end of the bearing without interruption; a finished bearing having a bearing surface of exposed Teflon filaments extending in one direction and intermediate Teflon-faced resin areas and having a crush-resistant body of resin-bound layers of glass filaments extending helically in alternate directions.

In particular, two problems were encountered in the development of the bearings of the present invention. For some time it was thought that, if not braided, the sleeve would have to be stretched on the mandrel. Shrinking the sleeve was considered but the possible difficulties in the axial shrinkage of sleeves of four feet in length, for example, temporarily diverted some attention to spiral wrapping and the braiding technique which is already part of the prior art. Also, it was known beforehand that whatever resin is used, it must extend without voids through the fabric to the surface of the mandrel. However, the Teflon yarns must also be pressed against the mandrel so that they are adequately exposed in the finished bearing. Some types of fabric require more pressure than others to provide the desired or necessary ratio of exposed Teflon to exposed resin.

The parallel yarns are of Teflon filaments and the circumferential threads are of a heat shrinkable material such as "Dacron", having also the necessary tensile strength, chemical stability, resistance to heat and cold flow, and, of course, capability of bonding to the resin to be employed.

This fabric can be woven to a size larger than the mandrel so that it can be readily drawn onto or over the mandel. The mandrel and sleeve are then heated so that the sleeve in particular shrinks circumferentially whereby it is adequately secured on the mandrel but is also uniquely disposed in that the Teflon yarns are still relatively loose so that the capillarity of the resin can effect a complete filling of the fabric before the application of the tape under tension further presses the sleeve against the mandrel. This tension is adjusted to provide the desired Teflon/resin ratio referred to.

BRIEF DESCRIPTION OF THE DRAWING

FIG. 1 is an enlarged view of a small section of the fabric as it may be woven into a sleeve.

FIG. 2 illustrates the fabric sleeve being drawn from a reel and onto the mandrel.

FIG. 3 is an enlarged longitudinal section through the sleeve as it is held against the mandrel by the shrinkage of the circumferential threads.

FIG. 7 illustrates the removal of the mandrel from the tube.

FIG. 8 illustrates cutting the tube to the desired bearing lengths after the ends are cut off.

FIG. 9 illustrates centerless grinding the outside of each bearing to the selected cylindrical diameter.

FIG. 10 is an enlarged section through one half of a completed bearing.

DESCRIPTION OF THE PREFERRED EMBODIMENT

Figure 4:
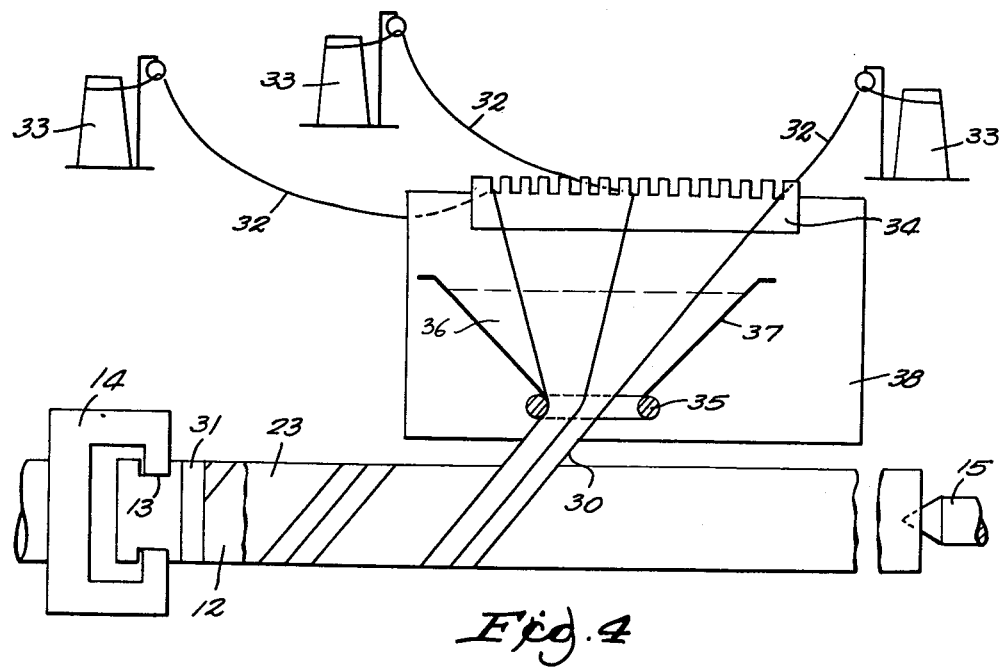
FIG. 4 shows in side elevation the mandrel as supported at its ends in a winding machine; the tape as it is wound over the sleeve; and, diagrammatically, the roves as they are drawn from creels through the liquid resin and through the ring of the winding machine.
Figure 5:
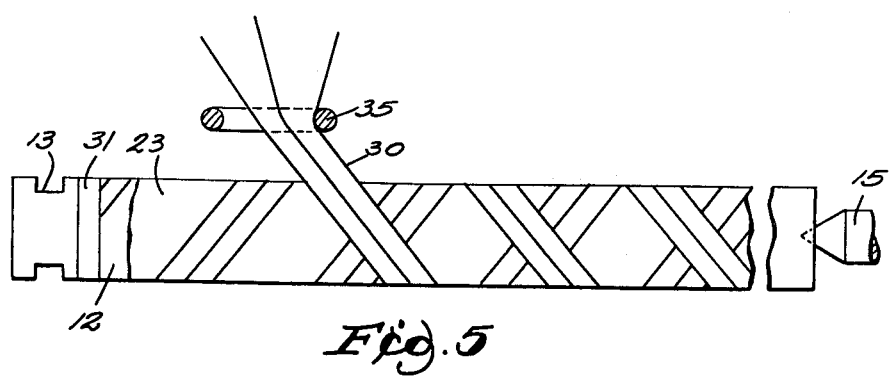
FIG. 5 shows the mandrel in elevation and the winding as it appears with the second spiral partially completed.
Figure 6:
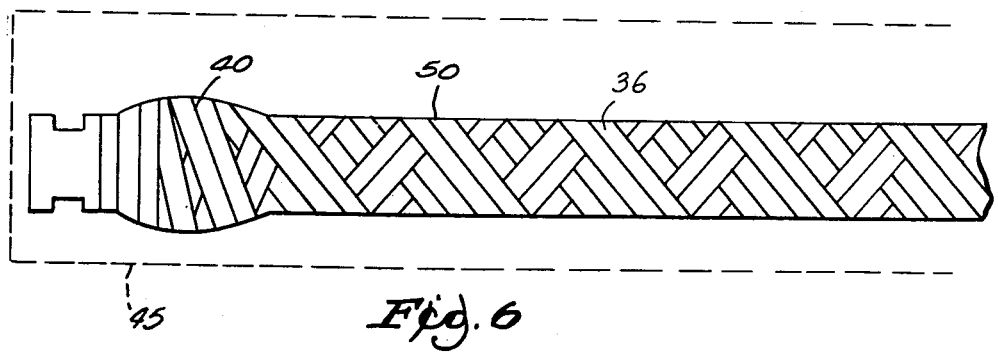
FIG. 6 is a plan view of the completed composite article of the present invention. The broken lines represent the curing oven in which the article may be placed where desired to cure the resin and succeeding steps to provide the completed bearings.

The mandrel 12 is of stainless steel provided with a smooth polished surface and a diameter which with correction factors will determine the size of the finished bearing. The corrective factors will be described subsequently. For convenience, the mandrel is machined as both ends 13 to fit the driving head 14 of the winding machine, not otherwise shown, and the supporting arbor 15.

The fabric 20 shown in the drawing includes a warp of Teflon yarns 21 and a fill of Dacron yarns 22. The fabric is woven in the form of the sleeve 23 having a size slightly larger than the circumference of mandrel 12 and may be stored on the reel 24. The satin weave shown is one of several which may be found suitable. Two filler yarns 22 of Dacron filaments are used, and they must, of course, be unshrunk. The Teflon yarns 21 have a denier very approximately twice that of the filler yarns 22 and may have a twist suitable to their warping. The denier of yarns 22 and 23 may be adjusted to provide optimum bearing properties with adequate securement of the fabric.

The mandrel is first coated with a parting-agent such as a silicone material available in an aerosol-pressurized spray can 27. Sleeve 23 is drawn from reel 24 and cut to a length less than that of mandrel 12 and drawn over mandrel 12. The mandrel is then placed in an oven to heat the sleeve momentarily to shrink yarns 22. Only a short time is required, and no appreciable heating of the mandrel is required although an oven temperature of 400° F. may be desirable to completely shrink the sleeve. Alternatively, the fabric might be directly heated by infra-red or high frequency radio wave radiation. Heating the mandrel directly by passing it directly through a magnetic induction field would also be possible; resistance heating the entire mandrel directly by passing through it a large low-voltage electric current would also be possible. However, the temperature of the mandrel affects the resin as it is applied to the sleeve, and the mandrel may have to be cooled prior to the next step.

In any case, some axial shrinking of three to four percent will occur, whereas circumferential shrinkage of the Dacron of up to 12 percent can be utilized to conform the sleeve to the mandrel and secure it thereto.

Mandrel 12 is then supported between driving head 14 and arbor 15 of the winding machine. At this point it may or may not be desirable to apply to sleeve 23 a preliminary coating of resin depending upon such factors as room temperature and the resin curing cycle.

The end of the prepared tape 30 is then secured as with band 31 to the end of the mandrel, as shown at the left in FIG. 4. Tape 30 consists of a number of parallel roves 32 of glass filaments and the resin carried thereby.

The roves are drawn as from the creels 33 and over the comb 34 in the usual manner.

Roves 32 may be dipped in a pan of resin before passing through the ring 35 disposed above the mandrel. Alternatively, as shown, roves 32 pass downwardly through the resin 36 carried in the cone 37 and through the ring 35 which comprises the lower end of the cone. Means such as a loose plug, not shown, is provoided to close the lower end of the cone sufficiently to retain the resin supply.

Comb 34 and cone 37 including ring 35 are supported by the reciprocating carriage 38, which may also be provided with means, not shown, to keep the cone supplied with resin.

With rotation of mandrel 12 and reciprocation of carriage 38, the sleeve 23 is wrapped with the tape 30 in the prior art manner described. In particular it may be noted that the sleeve need not extend beneath the enlarged ends 40 which are unusable and must be cut off. Some attention must also be given the tension applied to the tape in winding. A tension in the order of two to four pounds per rove has been found adequate to keep the tape tight and also to be sure of driving or forcing the resin through the sleeve to the mandrel. With such a tension, a pressure of two to four pounds per square inch would be applied to the sleeve. As previously mentioned, it is the adjustment of this pressure, by varying the tension referred to, which can be utilized within limits to adjust the ratio of exposed Teflon and resin at the bearing surface.

When the wrap is completed, the tape 30 is cut and the end is similarly secured as with band 31. The mandrel is then removed from the winding machine and is immediately ready for curing of the resin which has been applied.

The mandrel is handled at its ends only and is placed in the oven represented by the broken lines 45. The mandrel is supported horizontally by and between a rotating head (not shown) and and arbor (also not shown) so that the mandrel rotates in the order of 30 r.p.m. during the curing cycle.

Alternatively, resin 36 may be directly heated by infra red or high frequency radio radiation or the mandrel may be heated directly by magnetic induction or electrical resistance means.

Upon hardening of the resin 36, the rigid tube 50 is formed and when cooled may be removed from the mandrel. The cooling facilitates handling, and the contraction of the mandrel 20 relative to tube 50 facilitates removing the tube from the mandrel. For that purpose, the end of the tube 50 may be set against the block 51, and the end of mandrel 12 projecting therethrough may be pulled as with the gripper 52 to remove the same.

The tube 50 may be stored and, any time as required, the individual bearings 53 of the desired lengths may be cut therefrom. The exterior of each bearing is finished first by grinding. Centerless grinding as by placing the bearing between wheel 54 and the rollers 55 and 56 is entirely satisfactory for smaller sizes. Larger sizes would be chucked, and especially large sizes in the order of twelve inches in diameter and length might be ground in a lathe. The edges of the bearing may be smoothed with sanding.

The finished bearing 53 as shown in the enlarged section comprises the Teflon yarns 21 extending axially at the bearing surface, the Dacron yarns 22 extending circumferentially at the bearing surface, the surrounding layers of glass filaments of roves 32 extending in opposite spirals from end to end of the bearing, and the hardened resin 36 which forms the body of the bearing.

The portions of the Teflon yarns 21 which originally were in direct contact with mandrel 12 are, of course, sufficiently exposed to form the major part of the bearing surface. The bearing will be subject to the same break-in wear which is a characteristic of friction bearings and, if desired, accelerated wearing of the surface prior to its installation may be resorted to where a minimum running clearance of the bearing is desired.

Any of the synthetic resins available would be suitable for certain applications. In general, an epoxy resin which is relatively stable in storage is preferred. By adding a selected catalyst in certain amounts to the resin as it is used, its viscosity as well as a predetermined curing cycle in terms of time and temperature may be selected and periodically adjusted as previous results indicate.

The resin in liquid form should have a low viscosity as applied to the fabric sleeve so that the interstices of the fabric are entirely filled by capillary action. Conversely, it is essential that no air is trapped by the resin. Consistent curing results require, of course, consistent conditions throughout.

The temperature of mandrel 12 as well as of the resin during winding of tape 30 should be consistent, and room temperature (assumed to be consistent) is always the most convenient.

Upon heating, the resin should, of course, harden physically into a solid of uniform and adequate strength and should cure or change chemically into a solid of uniform and adequate resistance to chemical change.

The selection of yarns 22 to which the resin will securely bond, has been mentioned. The selection of a resin with a low temperature or a high temperature curing system may depend upon the type of yarns 22 selected. Generally, the Teflon of yarns 22 will be unaffected by the heat required for curing.

The corrective factors required in providing a mandrel of the size which will produce a bearing of the right size have been mentioned. It should be understood that the bearing will have the exact size of the mandrel at the time that the hardening of the resin occurs during the curing cycle and that the heating and expansion of the mandrel in relation to the time it is in the oven becomes a progressively greater variable.

Accordingly, for the present at least, a resin with a low temperature system is preferred so that the variable referred to is minimized, and in practice the size of the mandrel may be measured at room temperature. It is understood or known, of course, that friction (or low-friction) bearings of given diameters for tight, running or loose fits must be certain amounts of larger than the journals or shafts operating therein.

Another although lesser variable is the expansion of the mandrel relative to the nominal expansion of the Dacron yarns and glass filaments. Since the tension of the Dacron and glass influences the Teflon/resin ratio, the selection of a low temperature system similarly minimizes this variable.

Bearings may be produced in quantity at low cost from the intermediate article of the present invention. The fabric of the bearing is seamless. The tape which presses the sleeve against the mandrel operates with complete uniformity over the entire area of the fabric. Bearings of the same size can be consistently manufactured at relatively high speeds with consistent results.

The foregoing description of the invention and of the manner and process of making and using it sets forth the best mode or modes of carrying out the invention as presently contemplated. The following claims particularly point out and distinctly claim the subject matter which is regarded as the invention.

What is claimed is:

1. An article of manufacture adapted with further processing to provide an improved bearing of the type which comprises a glass filament reinforced resin body and a fabric embedded therein and having yarns of a low friction material forming the bearing face, said article of manufacture comprising:
    (a) a mandrel having substantially the outer dimensions of the element which is to operate in the bearing;
    (b) a seamless woven sleeve comprising a circumferential fill of heat-shrinkable yarns and an axial warp of low-friction yarns, said sleeve having been drawn over said mandrel while the heat-shrinkable yarns were in an unshrunk condition and then having been heat shrunk so as to conform the low-friction yarns in said sleeve to the outer surface of said mandrel; and
    (c) multiple layers of a continuous glass filament tape impregnated with a thermosetting liquid resin tightly and helically wound around said sleeve so as to further press the low-friction yarns in said sleeve against said mandrel, conforming the inner surface of the low-friction yarns to the outer surface of said mandrel.

2. An article of manufacture as claimed in claim 1 wherein the low-friction yarns in said tube are polytetrafluoroethylenes.

3. An article of manufacture as claimed in claim 1 wherein said glass filament tape comprises a plurality of parallel roves of glass filaments each of which is in substantially continuous contact with the adjacent rove or roves of said plurality of parallel roves throughout the length thereof.

4. The article of claim 1 wherein said mandrel is of metal such that its thermal expansion during curing of the thermosetting liquid resin enlarges said sleeve just sufficiently to facilitate the later removal as a tube
    (a) of said sleeve and said multiple layers of glass filament tape
    (b) from said mandrel
    (c) after such curing and recooling.

5. An article of manufacture as claimed in claim 1 wherein the heat-shrinkable yarns in said tube are polyethylene terephthalate.

6. An article of manufacture as claimed in claim 5 wherein the low-friction yarns in said tube are polytetrafluoroethylenes.

7. An article of manufacture adapted with further processing to provide an improved bearing of the type which comprises a glass filament reinforced resin body and a fabric embedded therein and having yarns of a low friction material forming the bearing face, said article of manufacture comprising:
    (a) a mandrel having substantially the outer dimensions of the element which is to operate in the bearing;
    (b) a seamless woven sleeve comprising a fill of heat-shrinkable yarns and a warp of low-friction yarns, said sleeve having been drawn over said mandrel while the heat-shrinkable yarns were in an unshrunk condition and then having been heat shrunk so as to conform the low-friction yarns in said sleeve to the outer surface of said mandrel; and
    (c) multiple layers of a continuous glass filament tape impregnated with a thermosetting liquid resin tightly and helically wound around said sleeve so as to further press the low-friction yarns in said sleeve against said mandrel, conforming the inner surfaces of the low-friction yarns to the outer surface of said mandrel.

8. An article of manufacture as claimed in claim 7 wherein the low-friction yarns in said tube are polytetrafluoroethylenes.

9. An article of manufacture as claimed in claim 7 wherein said glass filament tape comprises a plurality of parallel roves of glass filaments each of which is substantially continuous contact with the adjacent rove or roves of said plurality of parallel roves throughout the length thereof.

10. The article of claim 7 wherein said mandrel is of metal such that its thermal expansion during curing of the thermosetting liquid resin enlarges said sleeve just sufficiently to facilitate the later removal as a tube
    (a) of said sleeve and said multiple layers of glass filament tape
    (b) from said mandrel
    (c) after such curing and recooling.

11. An article of manufacture as claimed in claim 7 wherein the heat-shrinkable yarns in said tube are polyethylene terephthalate.

12. An article of manufacture as claimed in claim 11 wherein the low-friction yarns in said tube are polytetrafluoroethylenes.

13. An article of manufacture adapted with further processing to provide an improved bearing of the type which comprises a glass filament reinforced resin body and a fabric embedded therein and having yarns of a low-friction material forming the bearing face, said article of manufacture comprising:
    (a) a mandrel having substantially the outer dimensions of the element which is to operate in the bearing;
    (b) a fabric having yarns of a low-friction material, said fabric having been placed on said mandrel and having tension applied thereto circumferentially with respect to the mandrel so that said one side conforms closely with the outer dimension of the mandrel; and
    (c) multiple layers of a continuous glass filament tape impregnated with a thermosetting liquid resin tightly wound around said fabric so as to further press the low-friction yarns in said fabric against said mandrel, conforming the inner surfaces of the low-friction yarns to the outer surface of said mandrel, said glass filament tape comprising a plurality of helically wound parallel roves of glass filaments each of which is in substantially continuous contact with the adjacent rove or roves of said plurality of parallel roves throughout the length thereof.

14. An article of manufacture as claimed in claim 13 wherein the low-friction yarns in said tube are polytetrafluoroethylenes.

15. The article of claim 13 wherein said mandrel is of metal such that its thermal expansion during curing of the thermosetting liquid resin enlarges said sleeve just sufficiently to facilitate the later removal as a tube
    (a) of said sleeve and said multiple layers of glass filament tape
    (b) from said mandrel (c) after such curing and recooling.

16. An article of manufacture as claimed in claim 13 wherein the resin-bondable yarns in said tube are polyethylene terephthalate.

17. An article of manufacture as claimed in claim 16 wherein the low-friction yarns in said tube are polytetrafluoroethylenes.

* * * * *

UNITED STATES PATENT AND TRADEMARK OFFICE
CERTIFICATE OF CORRECTION

PATENT NO. : 4,107,381

DATED : 08-15-78

INVENTOR(S) : Neil W. Butzow, et. al.

It is certified that error appears in the above-identified patent and that said Letters Patent is hereby corrected as shown below:

[* On the title page the portion of the term of this patent subsequent to October 27, 1988

Signed and Sealed this

Twelfth Day of May, 1992

Attest:

DOUGLAS B. COMER

*Attesting Officer*   Acting Commissioner of Patents and Trademarks